UNITED STATES PATENT OFFICE.

CHARLES DE LA HARPE AND RUDOLF BURCKHARDT, OF BASEL, SWITZERLAND, ASSIGNORS TO THE FIRM OF DYE WORKS, FORMERLY L. DURAND HUGUENIN & CO., OF BASEL, SWITZERLAND.

GALLOCYANIN AND PROCESS OF MAKING SAME.

No. 898,040.  Specification of Letters Patent.  Patented Sept. 8, 1908.

Application filed April 21, 1908. Serial No. 428,411.

*To all whom it may concern:*

Be it known that we, CHARLES DE LA HARPE, chemist, and RUDOLF BURCKHARDT, doctor of philosophy and chemist, both citizens of the Swiss Republic, and residents of Basel, Switzerland, have invented a new and useful Improvement in Gallocyanins and a Process for the Manufacture of the Same, of which the following is a full, clear, and exact specification.

All hitherto known gallocyanins are violet blue to blue dyestuffs derived from the aromatic dialkyl-amins. We have discovered that if, in the manufacture of such dyestuffs monoalkylamins are used instead of dialkylamins, products are obtained which dye much redder, that is to say, pure violet tints, so that it is possible to produce with these new gallocyanins tints which have not hitherto been obtainable with dyestuffs of the gallocyanin series. In addition to this difference in tinctorial properties, these new gallocyanins are distinguished from those hitherto known by the fact that they can be transformed into nitrosoamin derivatives, while the gallocyanins heretofore produced yield no such derivatives.

The manufacture of these new gallocyanins forms the subject matter of the present invention and is effected by condensing, in a suitable medium, the nitrosomonoalkylarylamins with gallic acid or its derivatives.

*Example.* A mixture of 19 kilos of gallic acid, or an equivalent quantity of methylgallate, gallamic acid, gallanilid, gallonaphthylamid or catechin, with 200 liters of methyl or ethylalcohol and 25 kilos of nitrosomethylanilin hydrochlorid, or 28 kilos of nitrosomonoethylanilin hydrochlorid, or nitrosomonomethylorthotoluidin hydrochlorid, or 30 kilos of nitrosomonoethylorthotoluidin hydrochlorid, is boiled in a reflux apparatus until no more nitroso-compound is present. The mass is allowed to cool, eventually diluted with water, and filtered and the solid matter is pressed and dried. The product thus obtained is a powder having a bronze luster, which dissolves very sparingly in water to a violet solution; in concentrated sulfuric acid it dissolves to a blue solution which passes to red by dilution with water.

What we claim is:

1. The herein described process for the manufacture of new gallocyanins consisting in condensing the nitrosomonoalkylarylamins with gallic acid and its derivatives.

2. As new products the herein described gallocyanins derived from the nitrosomonoalkylarylamins, which dye pure violet tints, constitute powders with bronze luster dissolving sparingly in water to violet solution and dissolving in sulfuric acid to blue solution turning to red by dilution with water.

In witness whereof we have hereunto signed our names this 8th day of April, 1908, in the presence of two subscribing witnesses.

CHARLES DE LA HARPE.
RUDOLF BURCKHARDT.

Witnesses:
GEO. GIFFORD,
AMAND RITTER.